United States Patent [19]

Isobe et al.

[11] Patent Number: 5,048,063
[45] Date of Patent: Sep. 10, 1991

[54] MACHINE POSITION DETECTING APPARATUS

[75] Inventors: Shinichi Isobe, Oshino; Yoshiaki Ikeda, Hachioji, both of Japan

[73] Assignee: Fanuc Ltd, Minamitsuru, Japan

[21] Appl. No.: 423,459

[22] PCT Filed: Mar. 28, 1989

[86] PCT No.: PCT/JP89/00323
§ 371 Date: Sep. 29, 1989
§ 102(e) Date: Sep. 29, 1989

[87] PCT Pub. No.: WO89/09112
PCT Pub. Date: Oct. 5, 1989

[30] Foreign Application Priority Data

Mar. 28, 1988 [JP] Japan .................... 63-73650

[51] Int. Cl.⁵ .................... G06K 11/00; H03K 21/02; G05B 11/06
[52] U.S. Cl. .................... 377/17; 377/39; 377/43; 377/55; 340/870.19; 318/638
[58] Field of Search .................... 377/17, 25, 39, 43, 377/55; 340/870.19, 870.31; 318/569, 638

[56] References Cited

U.S. PATENT DOCUMENTS

| | | | |
|---|---|---|---|
| 4,155,003 | 5/1979 | Grassme | 377/55 |
| 4,566,111 | 1/1986 | Tanacawa | 377/39 |
| 4,779,075 | 10/1988 | Zagelein et al. | 340/870.19 |
| 4,805,199 | 2/1989 | Muramatsu | 377/39 |

FOREIGN PATENT DOCUMENTS 59-17605 1/1984 Japan.

Primary Examiner—John S. Heyman
Attorney, Agent, or Firm—Staas & Halsey

[57] ABSTRACT

A machine position detecting apparatus according to the invention detects the absolute position of a machine by a pulse coder or the like attached to a movable element. Whenever the movable element of the machine is stopped, a check is performed to determine whether the detected position of the movable element is accurate. This is accomplished by a counter for counting the amount of shift of an absolute position detector circuit in one revolution based on a rotational position signal, and a collator for collating contents of the counting means with contents of position memory means and checking the stored contents of the position memory means when the movable element is stopped.

5 Claims, 1 Drawing Sheet

COUNT RECORDED BY COUNTER 5      ----- 0,1,2,3, 2,1,0,-1,-2,-3,-4,-5,-6 ---

MACHINE POSITION DETECTING APPARATUS

RELATED APPLICATION

This application is related to U.S. Ser. No. 382,784, filed June 23, 1989.

BACKGROUND OF INVENTION

This invention relates to a machine position detecting apparatus for detecting the absolute position of a machine by a pulse coder or the like attached to a movable element.

BACKGROUND ART

In a machine tool equipped with an absolute position detector and controlled by a Computerized Numerical Controller (CNC) unit, absolute position stored on the position detector side is transferred to the CNC unit at the moment power is introduced, and the absolute position is stored in a register within the CNC unit. When the movement of the movable element is controlled by a move command from the CNC unit, the absolute position detector acts as a relative position detector and the register is updated based solely on the amount of movement to control the machine. More specifically, a return to the origin required at introduction of power is no longer necessary, absolute position is read out of the absolute position detector only once when the power supply is turned on, and the amount of relative movement obtained from the position detector is subsequently grasped as an electric signal to control the machine position.

With this conventional method of verifying absolute position, the accuracy of the machine stopping position is confirmed based solely on the absolute position data stored in the register within the CNC unit when the machine is stopped. Consequently, reliability is enhanced as problems associated with a decline in precision due to gear wear or the like do not arise. However, if an error should happen to develop in the contents of the register for some reason, such as an error produced by noise when reading in command data, there is no way to check this. The occurrence of such an error in the contents of the register can lead to machine malfunction. In addition, if it is necessary to verify the machine stopping position, as when tools are changed, the movable element must be returned to the origin. Various other problems arise as well.

SUMMARY OF THE INVENTION

The present invention has been devised in order to solve these problems and its object is to provide a machine position detecting apparatus in which it is possible to check the contents of data related to the absolute position of a movable element stored in a CNC unit.

In accordance with the present invention, there can be provided a machine position detecting apparatus for detecting a machine position of a movable element by a rotational position signal and a one-revolution signal from an absolute position detector circuit attached to the movable element, characterized by comprising position memory means for reading absolute position from the absolute position detector circuit when power is introduced, and for being updated subsequently by a movable element move command, counting means for counting an amount of shift of the absolute position detector circuit in one revolution based on the rotational position signal, and collating means for collating contents of the counting means with contents of the position memory means and checking stored contents of the position memory means when the movable element is stopped.

Accordingly, the machine position detecting apparatus of the present invention is such that absolute position stored by the position memory means and the count recorded by the counting means are collated, whenever the movable element is stopped, to check the data stored by the position memory means, whereby the presence of a malfunction can be determined with regard to reading of machine position.

DESCRIPTION OF THE PREFERRED EMBODIMENT

An embodiment of the present invention will now be described in detail with reference to the drawings.

Figure 1:
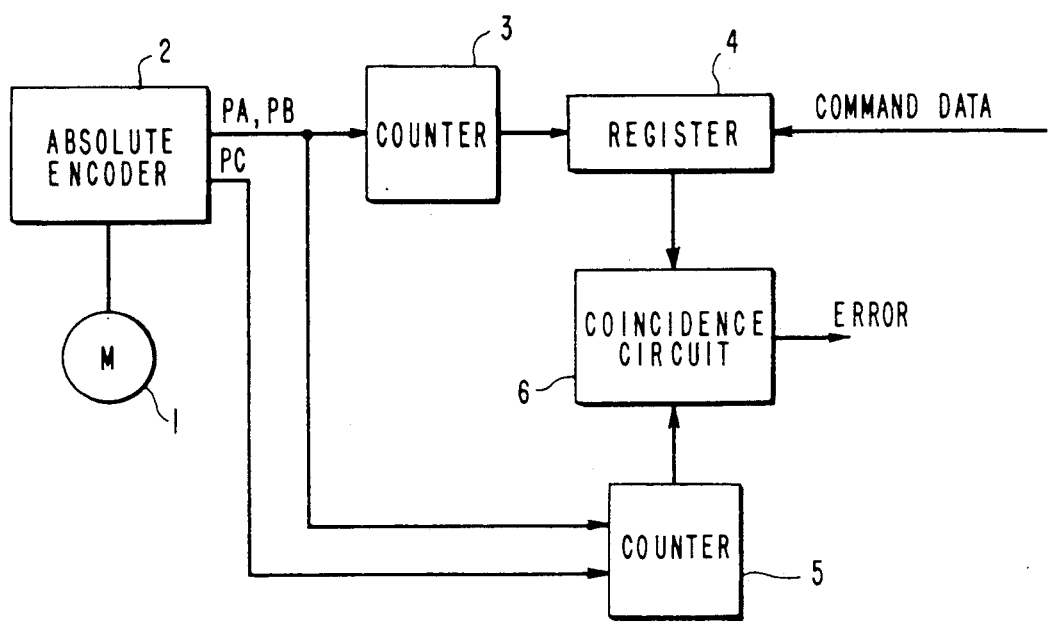
FIG. 1 is a block diagram illustrating an embodiment of the present invention.

FIG. 1 is a block diagram illustrating a machine position detecting apparatus according to the invention. A servomotor 1 is one of a plurality of axis drive means for driving the movable element of a machine tool controlled by a CNC unit. Attached to the output shaft of the servomotor is a pulse coder, such as an absolute encoder 2, for detecting absolute position. The absolute encoder 2 makes use of three signal output lines to output pulses PA, PB, which are 108° out of phase, as rotational position signals, and a one-revolution signal PC. A counter 3 stores absolute position data corresponding to the full stroke of the movable machine element moved by the servomotor 1 and is connected to a register 4, which is for storing absolute position, updated in accordance with the command data of the machine tool.

Connected to the absolute encoder 2 is a second counter 5 reset at the timing of the leading edge of the one-revolution signal PC. This counter counts a fraction of one revolution of the servomotor 1 by counting the pulses PA, PB. The counter 5 has a coincidence circuit 6 for collating this data with the data in the register 4. When the data do not coincide, the coincidence circuit 6 outputs an error signal.

Figure 2:
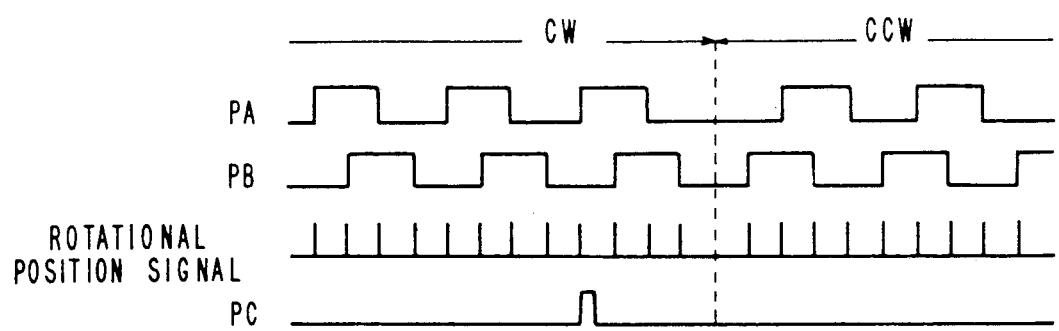
FIG. 2 is a view illustrating a pulse signal from an absolute encoder during movement.

FIG. 2 illustrates the signal outputs PA, PB indicating rotational direction and rotational position and counted by the counter 5, and the one-revolution signal PC which resets the counter 5. The servomotor 1 has a prescribed servo-circuit (not shown) which includes a servo-amplifier and is supplied with a position command based on an error between command data from the CNC unit and feedback data from the absolute encoder 2, or with a stop command, whereby its movement is controlled.

The operation of the position detecting apparatus having the foregoing construction will now be described.

When the power supply of the machine tool is turned on, data regarding the absolute position of the machine is read into the register 4 from a non-volatile memory storing the absolute position of the movable element on the side of the servomotor, by way of example. Ordinarily, this data is supplied first to the counter 3 via the signal line of the absolute encoder 2. When the data is stored in the register 4 as the initial value of the absolute position, the machine position is subsequently ascertained based on the contents of the register 4 on the side of the CNC. Accordingly, the contents of register 4 are updated sequentially by command data for the servomotor 1. If an error should develop in the contents of the register 4 at this time, the CNC unit will not be capable of controlling the machine tool accurately.

Therefore, in accordance with the invention, of the absolute position actually detected by the absolute encoder 2, the amount of shift detected based on the rotational position signal in the same direction within one revolution of the output shaft is counted at all times by the second counter 5, and the absolute position stored in register 4 and the count recorded in counter 5 are collated whenever the movable element is stopped, whereby the data stored as absolute position on the side of the CNC unit is checked. The counter 5, acting as an up/down counter, counts the amount of shift of the movable element corresponding to a fraction of one revolution of the output shaft. At the moment movement of the machine stops, a check is performed to determine whether the data stored in the absolute position register 4 and serving as a reference within the CNC unit accurately indicates the machine position based on the command data.

If the coincidence circuit 6 detects non-coincidence, an error signal is issued and the movable element of the machine is restored to, say, the prescribed machine origin to correct the contents of the register 4. By thus collating the contents of the register 4 when the machine is stopped, a malfunction on the side of the machine tool can be prevented before it occurs.

Though an embodiment of the present invention has been described, the invention it not limited thereto but can be modified in various ways without departing from the scope of the claims.

The machine position detecting apparatus of the invention is such that data relating to the absolute position of a movable element is checked to make it possible to reliably prevent malfunction of a machine tool or the like.

We claim:

1. A machine position error detecting apparatus for outputting an error signal based on a rotational position signal and a one-revolution signal output from an absolute position detector circuit attached to a movable element and based on a movable element move command, comprising:

position memory means for reading the absolute position detector circuit and storing an absolute position when power is introduced and for subsequently reading and storing the movable element move command;

counting means for counting and storing a count corresponding to an amount of shift indicated by the absolute position detector circuit based on said rotational position signal and the one-revolution signal; and collating means for providing the error signal based on comparing the amount of shift with the absolute position.

2. A machine position error detecting apparatus according to claim 1, wherein said position memory means comprises means for reading the absolute position detector circuit and storing an absolute position after the movable element is reset to an origin in response to the error signal and subsequently reading and storing the movable element move command.

3. A machine position error detecting apparatus according to claim 1, further comprising another counter means for reading the absolute position detection circuit and for storing an absolute position of the movable element at all times, whereby position detection is performed with regard to a full stroke of the movable element.

4. A method of detecting an error in the measured position of a movable element, said method comprising the steps of:

(a) measuring an absolute position of the movable element and storing the absolute position in a register upon power up;

(b) receiving and storing a movable element move command in the register after said step (a);

(c) measuring an absolute position of the movable element after said step (a); and (d) outputting an error signal by comparing the absolute position measured in said step (c) with the move command stored in the register in said step (b).

5. A method according to claim 4, further comprising the steps of:

(e) moving the movable element to an origin in response to the error signal; and (f) measuring an absolute position of the movable element and storing the absolute position in the register after said step (e).

* * * * *